(12) United States Patent
Suissa

(10) Patent No.: US 6,205,382 B1
(45) Date of Patent: Mar. 20, 2001

(54) METHOD SOFTWARE PRODUCT AND APPARATUS FOR SUPPRESSING HIGH-FREQUENCY OSCILLATIONS IN THE STEERED AXLES OF A VEHICLE

(75) Inventor: Avshalom Suissa, Renningen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/273,720

(22) Filed: Mar. 22, 1999

(30) Foreign Application Priority Data

Mar. 20, 1998 (DE) .............................. 198 12 236

(51) Int. Cl.[7] ........................................... G06F 7/00
(52) U.S. Cl. ............................ 701/41; 701/36; 701/72; 180/421; 180/446
(58) Field of Search .................... 701/36, 41, 42, 701/43, 72, 78, 82, 83; 180/421, 422, 444, 446, 197, 271; 330/140, 146

(56) References Cited

U.S. PATENT DOCUMENTS

| | | | |
|---|---|---|---|
| 4,830,127 | * 5/1989 | Ito et al. | 180/416 |
| 4,958,698 | * 9/1990 | Kirschner | 180/408 |
| 5,207,451 | * 5/1993 | Furuse et al. | 280/775 |
| 5,485,378 | * 1/1996 | Franke et al. | 701/41 |
| 5,557,520 | * 9/1996 | Suissa et al. | 701/29 |
| 5,694,319 | * 12/1997 | Suissa et al. | 701/41 |
| 5,944,137 | * 8/1999 | Moser et al. | 180/446 |
| 6,021,367 | * 2/2000 | Pilutti et al. | 701/41 |

FOREIGN PATENT DOCUMENTS

| | | |
|---|---|---|
| 32 25 543 | 1/1986 | (DE) . |
| 42 26 746 | 10/1993 | (DE) . |
| 43 25 413 | 2/1995 | (DE) . |

* cited by examiner

Primary Examiner—Jacques H. Louis-Jacques
(74) Attorney, Agent, or Firm—Evenson, McKeown, Edwards & Lenahan, P.L.L.C.

(57) ABSTRACT

A method sofeware and apparatus for suppressing high-frequency oscillations in the steered axles of a vehicle with a regulating device for regulating a steering angle on the basis of a setpoint that has been calculated. Active steering of this kind has the advantage that driving errors, within the scope of the physically possible, are prevented. However, the disadvantage is that as a result of the regulation of the steering angle, steering stiffness, and running-in behavior of the wheel, high-frequency oscillations of the wheel result around its vertical axis. The development of these oscillations is termed the shimmy effect. The shimmy effect is reliably prevented without adversely affecting the regulating quality of the steering angle by calculating the steering angle rate in a model of the steering and supplied it to the computer as an additional input value.

12 Claims, 1 Drawing Sheet

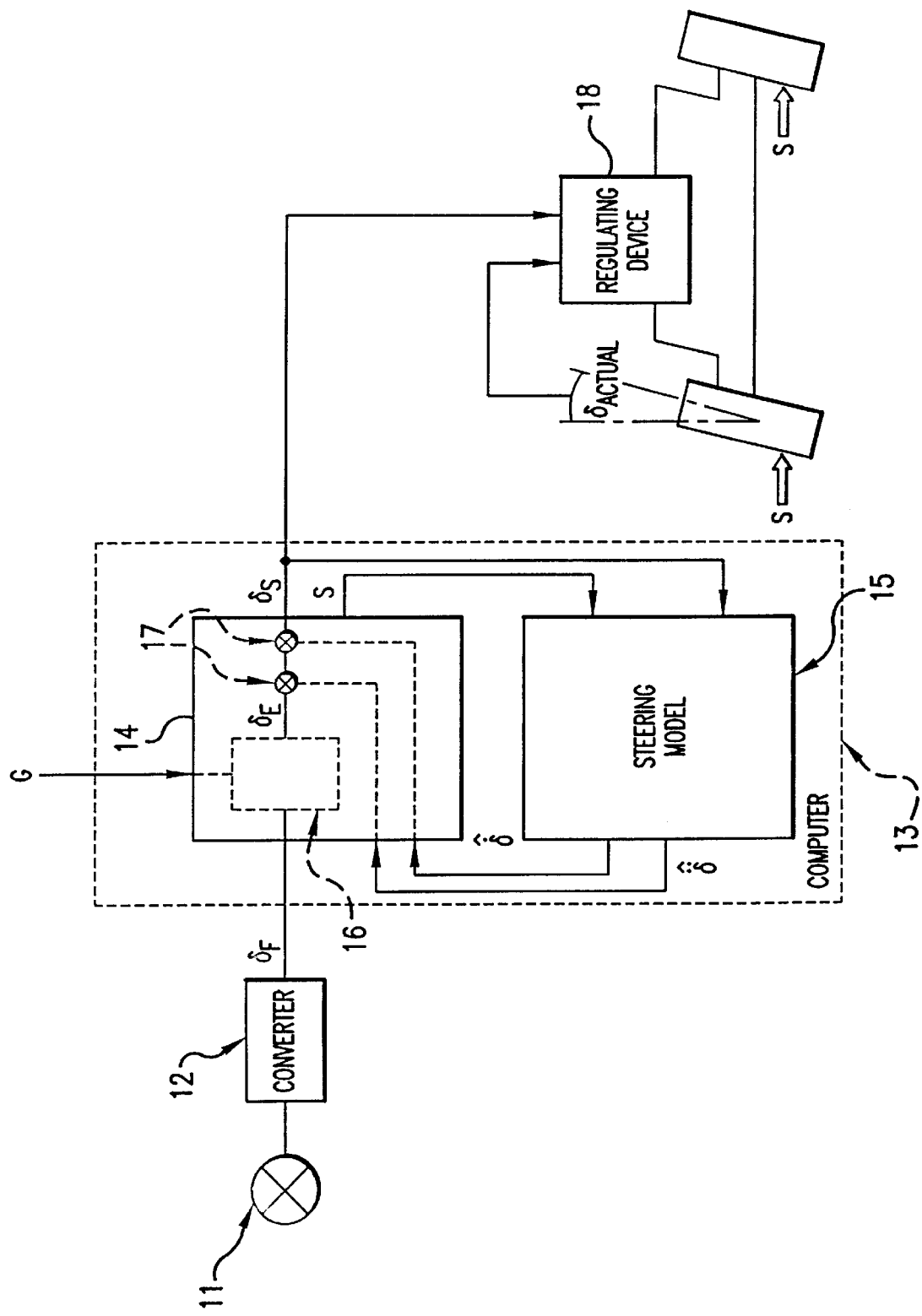

METHOD SOFTWARE PRODUCT AND APPARATUS FOR SUPPRESSING HIGH-FREQUENCY OSCILLATIONS IN THE STEERED AXLES OF A VEHICLE

BACKGROUND AND SUMMARY OF THE INVENTION

This application claims the priority of German Application No. 198 12 236.5, filed Mar. 20, 1998, the disclosure of which is expressly incorporated by reference herein.

The invention relates to a method for suppressing high-frequency oscillations in the steered axles of a vehicle with a regulating device for regulating a steering angle, as is known, for example, from German Patent document DE 42 26 746 A1.

A method is described in German Patent document DE 43 25 413 A1 that makes it possible to calculate in a computer a steering angle that depends on a driving situation. A setpoint of the steering angle is calculated on the basis of the steering wheel angle produced by the driver using the steering wheel as an actuating means, as well as the yaw angle rate as a value that characterizes the driving behavior.

Active steering of this type has the advantage that the range of driving states that can be controlled within the framework of what is physically possible is expanded. However, the disadvantage is that as a result of the regulation of the steering angle, the steering stiffness, and the running-in behavior of the wheel, high-frequency oscillations of the wheel around its vertical axis result. The occurrence of these oscillations is termed the "shimmy" effect.

The development of this "shimmy" effect could be counteracted by low-pass filters for the setpoint of the steering angle. However, this has the disadvantage that the bandwidth of the regulation of the steering angle and therefore its regulating quality deteriorate. Regardless of the regulation of the steering angle, the high-frequency oscillations can also be excited by the actuation of the brake.

The goal of the invention is to reliably prevent the occurrence of the shimmy effect while at the same time not adversely affecting the regulating quality of the steering angle.

This goal is achieved using a regulating system for the steering angle in order to perform a method for suppressing high-frequency oscillations in the steered axles of a vehicle. The regulating device at the steered axle acts to regulate a steering angle as a function of a setpoint ($\delta_S$) that has been calculated. With a computer in which, in a setpoint calculator, on the basis of (1) a steering wheel angle specified at an actuating means by the driver; and (2) at least one value characterizing the driving behavior of the vehicle, the setpoint is determined for the steering angle and supplied to the regulating device. A value for the steering rate is determined in the computer on the basis of a model for the steering and is supplied to the setpoint calculator as an additional input value.

A setpoint for the steering angle is fed to a regulating device. The regulating device regulates the setpoint at the steered axle associated with it. The setpoint is calculated in a computer, and in addition to the steering angle specified by the driver and values that characterize driving behavior, a value of the steering rate calculated on the basis of the model of the steering is supplied as input values.

According to embodiments of the invention, the lateral force on the steered wheels and/or the setpoint of the steering angle are used to calculate the steering rate. In another embodiment of the invention, the steering acceleration can be calculated in addition to the steering rate and supplied to the setpoint calculator.

Other objects, advantages and novel features of the present invention will become apparent from the following detailed description of the invention when considered in conjunction with the accompanying drawings.

BRIEF DESCRIPTION OF THE DRAWING

The single figure is a schematic representation of a regulator according to the present invention.

DETAILED DESCRIPTION OF THE DRAWING

The driver steers the vehicle using an actuator 11, such as a steering wheel. Converter 12 converts the input from the driver into an electrical signal that represents the steering wheel angle $\delta_F$. This signal is supplied to computer 13. Computer 13 has two function blocks. One of them is the setpoint calculator 14 and the other is the steering model 15. Signals G are also supplied to the computer 13, said signals representing the driving behavior of the vehicle, for example the yaw rate $\dot{\Psi}$ and the wheel rpm $\omega_i$, of the wheels. On the basis of these signals G as well as the steering wheel angle $\delta_F$, a value $\delta_E$ is calculated in block 16 for the steering angle of the steered wheels on the axle. This value is linked in the logic devices 17 with the estimated steering rate $\hat{\dot{\delta}}$ and the steering acceleration $\hat{\ddot{\delta}}$. The resultant setpoint $\delta_S$ of the steering angle is supplied to regulating device 18 for controlling the steering angle at the steered axle and to the steering model 15 within computer 13. The steering regulator regulates the setpoint $\delta_S$ for the steering angle at the wheels; the actual value of the steering angle of the wheels $\delta_{act}$ is supplied to it for this purpose.

To determine the estimated values for the steering rate $\hat{\dot{\delta}}$ and steering acceleration $\hat{\ddot{\delta}}$, a value for the lateral force S at the steered axle is also supplied to the steering model 15. The value for the lateral force S can be derived for example from the setpoint calculator 14, provided this value has been calculated or estimated in the calculation of a value for the setpoint $\delta_S$ for the steering angle. Otherwise, it can also be calculated from the values that characterize the driving behavior, the transverse acceleration $a_y$ and the yaw acceleration $\ddot{\Psi}$ using the equation $$S = \frac{l_h a_y m + I_z \ddot{\Psi}}{l_v + l_h} \quad \text{(EQ 1)}$$

where m is the weight of the vehicle, $l_v$ and $l_h$ each are the distances of the front axle and rear axle respectively from the center of gravity of the vehicle, and $I_z$ is the moment of inertia of the vehicle around the vertical axis.

It will now be shown, using the example of a steered, non-powered front axle, how the estimated values can be determined in the steering model 15 and how these values can be linked with the value $\delta_E$ calculated in block 16 for the steering angle in order to find the setpoint $\delta_S$.

From the moments acting on the wheels of the front axle, the differential equation is obtained as follows:

$$I_{Rad}\ddot{\delta} = -k_D \dot{\delta} + c_L(\delta_S - \delta) - n_K S; \quad \text{(EQ 2)}$$

where $k_D$ represents the characteristic damping constant for the wheel, $C_L$ represents the steering stiffness, and $n_K$ represents the coasting of the vehicle. The damping constant and steering stiffness as well as the moment of inertia of the wheel are constant values that can be stored as known values.

Only the last term $-n_K S$ of the equation is based on the fact that a lateral force is acting on the wheel, while the other two terms are based on the undesired disturbances. Thus, we obtain for the steering acceleration $$\hat{\ddot{\delta}} = -\frac{n_K S}{I_{Rad}} + \frac{c_L}{I_{Rad}}(\delta_S - \delta) - \frac{k_D}{I_{Rad}}\dot{\delta}. \quad \text{(EQ 3)}$$

By integration, we then obtain the following expression for the estimated values of the steering rate and steering angle:

$$\hat{\dot{\delta}} = \hat{\dot{\delta}}_{OLD} + \hat{\ddot{\delta}} \cdot dt,$$
$$\hat{\delta} = \hat{\delta}_{OLD} + \hat{\dot{\delta}} \cdot dt, \quad \text{(EQ4)}$$

which can be calculated in the computer for example by numerical integration using the Euler method, with $\hat{\dot{\delta}}_{OLD}$ and $\hat{\delta}_{OLD}$ being the values of the previous regulating cycle.

These estimated values for the steering rate $\hat{\dot{\delta}}$ and the steering acceleration $\hat{\ddot{\delta}}$ can then be fed to the setpoint calculator. There, the logic elements 17 are used to add terms to the value $\delta_E$ that take into account the steering acceleration and the steering rate. The expression for setpoint $\delta_S$ is thus obtained:

$$\delta_S = \delta_E + \epsilon_1 \hat{\dot{\delta}} + \epsilon_2 \hat{\ddot{\delta}} \quad \text{(EQ 5)}$$

where $\epsilon_1$ and $\epsilon_2$ are feedback constants whose values must be adjusted in the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for suppressing high-frequency oscillations in a steered axle of a vehicle, wherein a regulating device at the steered axle acts to regulate a steering angle as a function of a setpoint that has been calculated with a computer in which, in a setpoint calculator, the setpoint is determined for the steering angle and supplied to the regulating device on the basis of a steering wheel angle specified at an actuator by a driver of the vehicle and at least one value characterizing a driving behavior of the vehicle, and further wherein a value for a steering rate is determined in the computer on the basis of a model for the steering and is supplied to the setpoint calculator as an additional input value to determine the setpoint.

2. The method according to claim 1, wherein at least the setpoint of the steering angle is used to calculate the value of the steering rate as an input value.

3. The method according to claim 2, wherein the steering angle obtained in a the previous regulating cycle is used as the setpoint of the steering angle.

4. The method according to claim 3, wherein in addition to the steering rate, a steering acceleration is also calculated and fed to the setpoint calculator as an input value.

5. The method according to claim 2, wherein at least one value for a the lateral force of the steered axle is used to calculate the value of the steering rate as an input value.

6. The method according to claim 2, wherein in addition to the steering rate, a steering acceleration is also calculated and fed to the setpoint calculator as an input value.

7. The method according to claim 1, wherein at least one value for lateral force of the steered axle is used to calculate the value of the steering rate as an input value.

8. The method according to claim 4, wherein in addition to the steering rate, a steering acceleration is also calculated and fed to the setpoint calculator as an input value.

9. The method according to claim 1, wherein in addition to the steering rate, a steering acceleration is also calculated and fed to the setpoint calculator as an input value.

10. A method for suppressing high-frequency oscillations in a steered axle of a vehicle driven by a driver, the method comprising the acts of:

determining a steering rate value in a computer based on a model for vehicle steering;

specifying a steering wheel angle at an actuator by the driver;

providing at least one value characteristic of a driving behavior of the vehicle;

calculating in a setpoint calculator in the computer a setpoint for the steering angle on the basis of the specified steering wheel angle, the at least one value characteristic of the driving behavior, and the steering rate value determined based on the model of vehicle steering; and regulating the steering angle as a function of the calculated setpoint via a regulating device.

11. A software product, comprising:

a computer readable medium having stored thereon program code segments that:
 determine a steering rate value in a computer based on a model for vehicle steering;
 determine a steering wheel angle at an actuator by the driver;
 determine at least one value characteristic of a driving behavior of the vehicle;
 calculate in a setpoint calculator in the computer a setpoint for the steering angle on the basis of the specified steering wheel angle, the at least one value characteristic of the driving behavior, and the steering rate value determined based on the model of vehicle steering.

12. An apparatus for suppressing high-frequency oscillations in a steered axle of a vehicle driven by a driver, the apparatus comprising:

a regulating device coupled to regulate a steering angle based on a calculated setpoint;

a computer providing the calculated setpoint as an output to the regulating device, said computer receiving as inputs to a setpoint calculator a steering wheel angle specified by the driver, at least one value characteristic of driving behavior of the vehicle, and a steering rate value determined in the computer based on a model of the vehicle steering.

* * * * *